United States Patent
Woodward et al.

[11] Patent Number: 5,578,104
[45] Date of Patent: Nov. 26, 1996

[54] METHOD OF AND APPARATUS FOR BENDING GLASS SHEETS

[75] Inventors: Alan C. Woodward, Wigan; Geoffrey Greenhalgh, Orrell, both of United Kingdom

[73] Assignee: Pilkington Glass Limited, St. Helens, United Kingdom

[21] Appl. No.: 420,800

[22] Filed: Apr. 12, 1995

[30] Foreign Application Priority Data

Apr. 15, 1994 [GB] United Kingdom ............... 9407594

[51] Int. Cl.$^6$ ................................. C03B 23/03
[52] U.S. Cl. ................... 65/106; 65/104; 65/114; 65/290
[58] Field of Search ............... 65/106, 102, 104, 65/111, 114, 273, 287, 289, 290, 291

[56] References Cited

U.S. PATENT DOCUMENTS

| | | |
|---|---|---|
| 3,905,794 | 9/1975 | Revells et al. . |
| 4,571,253 | 2/1986 | Revells et al. ............... 65/273 |
| 4,589,901 | 5/1986 | Yoshizawa et al. ............... 65/107 |
| 4,606,749 | 8/1986 | Nushi et al. ............... 65/106 |
| 5,004,492 | 4/1991 | Borer et al. . |
| 5,122,177 | 6/1992 | Yashizawa et al. ............... 65/106 |
| 5,279,635 | 1/1994 | Flaugher et al. . |
| 5,286,271 | 2/1994 | Rueter et al. . |

FOREIGN PATENT DOCUMENTS

| | | |
|---|---|---|
| 0364415 | 4/1990 | European Pat. Off. . |
| 0555079 | 8/1993 | European Pat. Off. . |
| 2162170 | 5/1988 | United Kingdom . |

*Primary Examiner*—Donald E. Czaja
*Assistant Examiner*—Calvin Padgett
*Attorney, Agent, or Firm*—Burns, Doane, Swecker & Mathis, L.L.P.

[57] ABSTRACT

The glass sheet is heated to a heat-softened condition in a furnace, and conveyed to a prescribed position above an upper shaping surface of a ring mold. The sheet is then transferred onto the ring mold by lowering part of the conveyor means, and bent by a process involving raising both the ring mold and the conveyor means. This combination minimizes the introduction of optical distortion into the sheet. A preferred bending process is to press bend the sheet between the ring mold and an opposed upper bending mold.

16 Claims, 8 Drawing Sheets

METHOD OF AND APPARATUS FOR BENDING GLASS SHEETS

BACKGROUND OF THE INVENTION

1. Field of the Invention

The present invention relates to the bending of glass sheets, and more particularly, to a method and apparatus for transferring a heat-softened glass sheet from a conveyor means onto an outline bending mould, i.e. a ring mould, raising the mould, and bending the sheet. The invention finds application in, but is not limited to, a shaping process known as press bending, in which a heat-softened glass sheet is pressed between opposed complementary shaping surfaces. This process is used principally for the bending of glass sheets to manufacture panes for automotive use.

2. Description of the Related Art

Strict requirements are placed upon the optical quality of automotive glass panes, principally from the safety aspect (to ensure an undistorted view through a vehicle window), but also from an aesthetic aspect, since optical faults may have an adverse effect on the external appearance of a vehicle. It goes without saying that automotive glass panes must be free from surface imperfections such as marks, which render the glass objectionable from both safety and aesthetic aspects.

The standard of optical quality required has increased over the years, and demands placed upon glass shaping processes have increased still more owing to the increasingly difficult shapes to which a glass sheet must be bent for modern vehicles while achieving increased optical quality. It is in fact more difficult to achieve good optical quality on a deeply bent shape, and also on a complex shape, for example, than on a shallow, or simple shape. A simple shape is one in which the glass sheet is bent around one or more axes in a single direction, whereas in a complex shape the sheet is bent about two sets of axes at right angles to each other.

Optical or physical distortion of a heat-softened glass sheet may be introduced at a variety of points in a bending process; for instance when the sheet is transferred from a conveyor means onto a ring mould, and then bent. A ring mould is a bending mould comprising a shaping rim which contacts only the periphery of the glass sheet.

Various different conveyor means have been used in glass bending processes, for instance, glass sheets may be conveyed on a roller hearth, i.e. sets of rollers, which may be straight or curved, continuous, segmented, or comprise several short discrete rollers. Discrete rollers may be so short as to constitute discs. Alternatively, sheets may be conveyed on a gas hearth, that is, on a cushion of gas, which may for example be hot air, or the gaseous products of burning a combustible gas. The gas forming such a gas cushion emanates from apertures in a straight or curved bed.

Transfer of the heat-softened sheet from the conveyor means onto a ring mould is particularly critical in the roller hearth process. When the sheet is considerably hotter than the rollers, the nearest pause of the glass on the rollers will cause optical distortion in the form of striations, resulting from the localised temperature change in the parts of the sheet in contact with the rollers. If the sheet is stationary for a longer period of time, or is especially hot, it will begin to slump around the rollers, producing a corrugated physical distortion of the sheet known as "roller wave". The first of these faults is especially likely to occur if transfer to the ring mould takes place 'out of the heat', i.e. outside the furnace in which the glass sheet was heated up to bending temperature.

From the above it will be clear that it is desirable to avoid any periods of time for which the heat-softened glass sheet is stationary on the conveyor rollers, i.e. it is desirable that the sheet be transferred to the ring mould as soon as the sheet is in the correct position relative to the ring mould.

It is also desirable to separate the operations of transfer of the sheet, and bending the sheet. This provides valuable flexibility in the relative timing of the operations.

It is known from a variety of documents including U.S. Pat. No. 5,286,271 to transfer a heat-softened glass sheet from rollers onto a ring mould by arranging the ring so that it can rise through the rollers from an initial position below the rollers to a second position above them, thereby lifting the sheet from the rollers. As an alternative, U.S. Pat. No. 5,286,271 discloses the possibility of moving the rollers downwards so that the sheet is placed upon the ring.

EP 364,415 discloses a process and apparatus for bending glass sheets in which conveyor rollers are provided between male and female bending moulds. The conveyor rollers are downwardly mobile, one roller descending in an opposite direction with respect to the adjacent roller. That is, the rollers incline in opposite directions, so that they all point downwards but each roller crosses adjacent rollers. The result is that they form a cradle to receive the sheet after it has been bent.

GB 2,162,170 discloses a press bending apparatus for glass sheets in which a sheet is bent and tempered in a single station by providing upper and lower moulds containing apertures through which cooling air may be blown. During tempering, the bent sheet is oscillated on an auxiliary ring to temper it uniformly. Before bending, the sheet is placed on the auxiliary ring by lowering conveyor rolls. The upper mould moves downwards to press the sheet into the lower mould, then both upper and lower moulds are retracted for tempering. This is to provide space for the auxiliary ring to oscillate, and cooling air to escape.

A disadvantage of bending and tempering in a single station is that for bending, the shaping surfaces need to be relatively hot, whereas tempering inevitably results in cooling of the shaping surfaces during quenching. Temperature cycling in the station, thermal inefficiency and long processing times per sheet ("cycle time") are the consequences.

Shaping the sheet by downward movement of the upper mould so as to press it against the lower mould (which is below the initial level of the conveyor rolls) necessitates a considerable downward travel by the upper mould. The upper mould, being normally a full-face mould of metal or refractory, tends to be heavy, and undergoes large accelerations and decelerations in the course of its reciprocating movement. A mechanism capable of actuating the upper mould is likely to be bulky, complex and expensive. If the actuating mechanism is of an insufficient specification, operation of the upper mould may be slow, contributing to the cycle time, and/or inaccurate in terms of timing or positioning relative to the lower mould.

SUMMARY OF THE INVENTION

It has now been found that a method of bending a glass sheet which includes transferring a heat-softened glass sheet from conveyor means onto a ring mould by lowering the conveyor means, and raising both the ring mould and conveyor means, yields previously unexpected advantages.

According to the present invention there is provided a method of bending a glass sheet, comprising:

heating the sheet to a heat-softened condition, conveying the sheet on substantially horizontal conveyor means to a prescribed position above an upper surface of an ring mould, transferring the sheet from the conveyor means onto the ring mould, bending the sheet to a predetermined shape, and cooling the bent sheet, wherein transferring the sheet is effected by lowering part of the conveyor means from an upper position, in which the conveyor means conveys the sheet to said prescribed position, in a lower position below the upper surface of the ring mould, the parts of the conveyor means remaining substantially horizontal, and wherein bending the sheet comprises the step of raising both the ring mould and the conveyor means.

This combination advantageously integrates transfer and bending and allows the actuating mechanism to be smaller and cheaper than when the upper mould is actuated. Although one may have considered it possible that, on lifting the sheet, the centre of the heat-softened sheet would sag owing to inertial forces, this has surprisingly not been found to be a problem in practice.

Preferably, the glass sheet is bent in a first station, i.e. a bending station, and transferred to a second station, i.e. a cooling station, where the sheet is cooled. The sheet may be annealed, e.g. if it is to be laminated, or quenched so as to temper it. The provision of separate bending and cooling stations avoids the problem, which is encountered when bending and quenching in a single station, of the station (and in particular the moulds) being cooled together with the glass sheet during quenching, and then being at too low a temperature for bending the next sheet. This aspect of the invention alleviates the thermal inefficiency which results from reheating a single station.

It is advantageous if transfer of the heated sheet onto the ring mould occurs outside the furnace. The engineering of the moving elements of the apparatus is thereby simplified, as they operate in a less arduous environment. This enables the costs of the apparatus to be reduced. Furthermore, it is in such a situation that the glass sheet is likely to be hotter than the conveyor means and therefore prone to optical distortion if a pause occurs while the sheet is on the conveyor means.

Preferably, to support the heat-softened glass sheet better, part of the conveyor means is provided within the ring mould. This part of the conveyor means is lowered through the ring mould to transfer the sheet onto the ring mould.

One way of carrying out the invention is to support both the ring mould and the conveyor means on a common support, and raise them by raising the common support. This advantageously simplifies the engineering of the invention.

The invention allows some flexibility in the relative timing of the transfer of the glass sheet, and the start of the bending operation. The timing of the transfer is governed by the lowering of the conveyor means, whereas the start of bending is determined by the raising of the ring mould. Raising of the ring mould may occur before, simultaneously with, or after, the lowering of the conveyor means. Preferably there is some overlap, i.e. the ring mould begins to lift before lowering of the conveyor means has been completed.

The present invention also provides an apparatus for bending a glass sheet, comprising:

a furnace for heating the sheet to a heat-softened condition, substantially horizontal conveyor means for conveying the sheet to a prescribed position above an upper surface of a ring mould, raising/lowering means for moving part of the conveyor means between an upper position, in which the conveyor means conveys the sheet to said prescribed position, and a lower position below the upper surface of the ring mould, in which lower position the part of the conveyor means remains substantially horizontal, elevator means for raising both the ring mould and the conveyor means, shaping means for bending the sheet to a predetermined shape, and means of cooling the sheet.

Preferably the conveyor means comprises a plurality of spaced rollers arranged to define a surface for supporting the glass sheet. The rollers may be straight or curved, continuous or segmented, and may extend across the full width of the apparatus, or be shorter, and extend only partway across the width.

Advantageously, short discrete rollers are provided both inside the ring mould and outside it, and are of optimised lengths and spacings so as to optimally support the heat-softened sheet. Preferably, the rollers within the circumference of the ring mould substantially span said ring mould.

The rollers may be so short as to constitute discs. Discs have the advantage that the conveyor means may be easily adapted for other ring moulds of different size of shape (for the production of differently sized or shaped panes) simply by adding or removing discs, whereas discrete short rollers which extend from one side of the ring mould to the other have to be custom made to the corresponding length of the other ring moulds.

The ring mould may be the lower mould of a pair of press bending moulds having opposed complementary shaping surfaces. Press benders are capable of high volume, high quality production and so have been installed in countries where there is a sufficiently high demand for automotive glass to justify the relatively high capital cost. The invention has found particular application in press benders because they usually include a roller hearth furnace to heat the glass to its bending temperature. In the context of a press bender, raising of both the ring and the conveyor means may be continued until the glass sheet is pressed against the upper mould and bent to shape. Alternatively the upper mould may be lowered to meet the lower mould in its raised position.

Preferably, the upper mould is a vacuum mould, i.e. a mould within which the pressure may be reduced, and with a shaping surface perforated by apertures, so that the glass sheet may be held on the shaping surface by the pressure difference across the faces of the sheet. The provision of a vacuum mould may assist in shaping the sheet, and facilitates handling of the sheet after bending.

Again, unlike a known transfer technique employed on press benders in which an upward movement of the lower mould both lifts the sheet from the rollers and presses it against the upper mould, transfer according to the invention allows the timing of the rise of the lower mould to be rather more flexible. As it is no longer instrumental in effecting transfer, the start of the rise may be delayed by up to 0.5 second without ill-effect.

The invention also relates to a glass sheet bent by a method or on an apparatus in accordance with the invention.

BRIEF DESCRIPTION OF THE DRAWINGS

A preferred embodiment of the invention will now be described by way of a non-limiting example with reference to the accompanying drawings in which.

DETAILED DESCRIPTION OF THE PREFERRED EMBODIMENT

Figure 1:
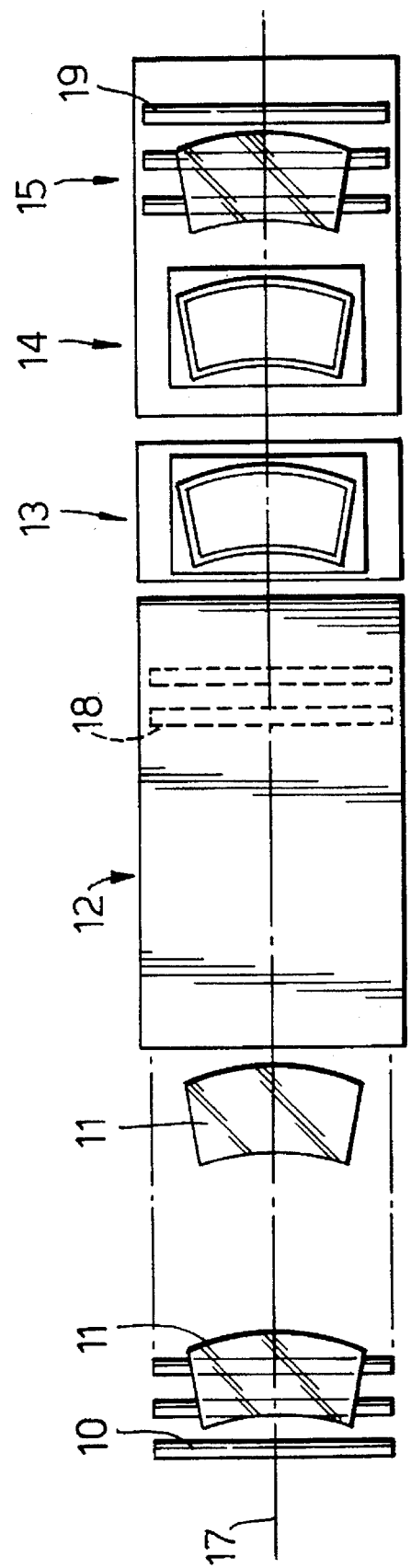
FIG. 1 is a highly schematic overall plan view of a press bending apparatus in which the invention may be used.

Referring to FIG. 1, the drawing shows a press bending apparatus comprising a first or supply conveyor means 10 which delivers glass sheets 11 to the entrance of a furnace 12. The furnace includes a second conveyor means 18 which transports the sheets 11 through the furnace and delivers them to a press bending station 13 where the heat-softened glass sheets are positioned between complementary opposed shaping surfaces provided on press members in the form of moulds. The press bending station is equipped with a third conveyor means (not shown). The bent sheets are then transported through a cooling station 14 where they may be tempered or annealed, and into an unloading station 15, where the bent sheets are transferred onto a fourth conveyor means 19, all in conventional fashion. The apparatus has a centreline 17.

Figure 2:
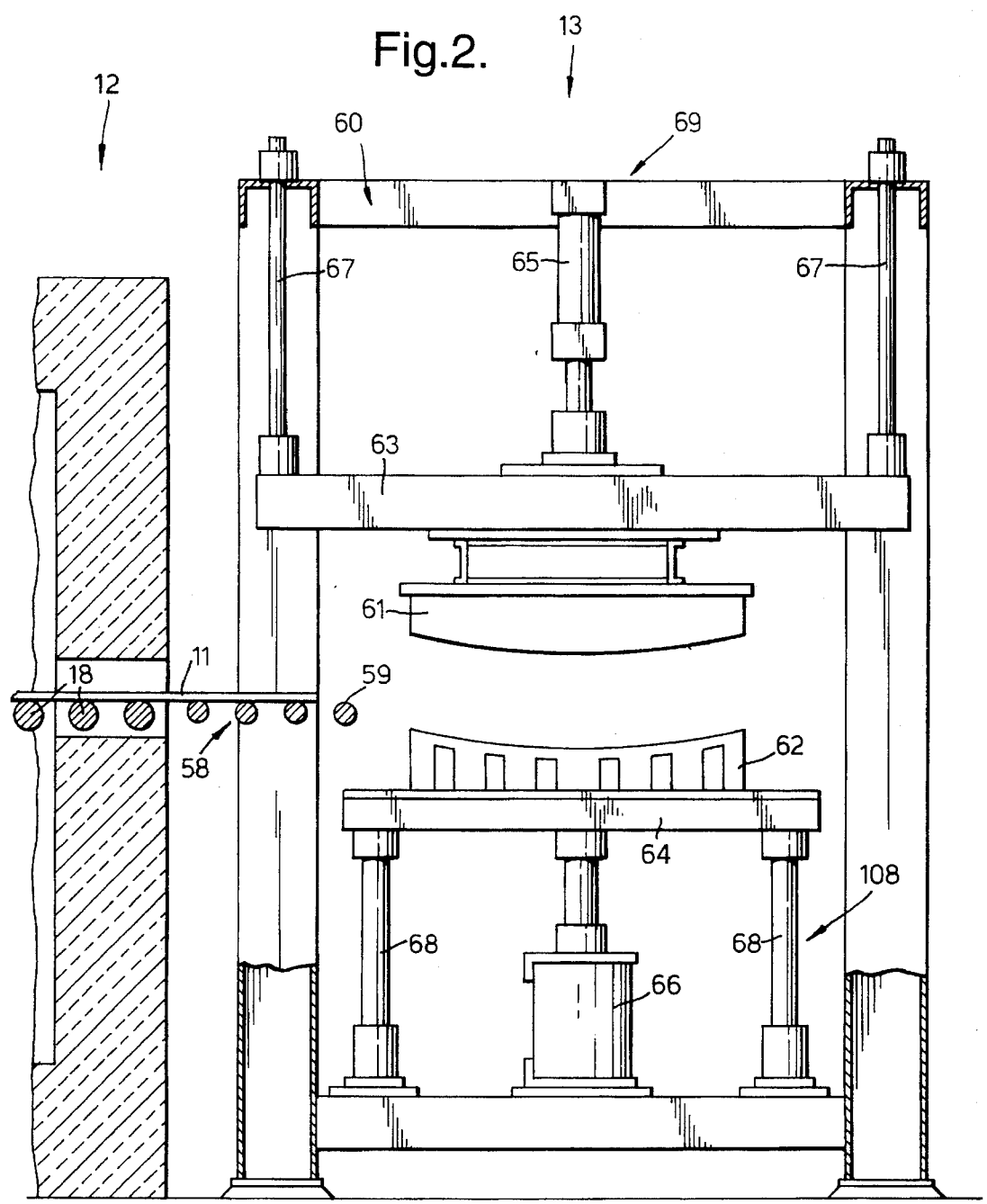
FIG. 2 is a side view, partly in section, of a press suitable for use on the apparatus of FIG. 1 showing its location next to the exit from the furnace.

FIG. 2 shows the latter part of furnace 12 and the press bending station 13, comprising a press 69 having opposed press members in the form of moulds as described above. The press is known in general terms from a variety of documents including WO 93/14038 corresponding to U.S. Pat. No. 5,279,635 the disclosure of which is hereby incorporated herein by reference. It comprises a frame 60 with upper mould 61 and lower mould 62 mounted for opposed reciprocating movement within it. Upper mould 61 is preferably a vacuum mould, whereas lower mould 62 is an outline mould and thus constitutes a ring mould. Moulds 61, 62 are each mounted on a platen 63, 64 respectively, which reciprocate vertically, and guided by guiding members 67, 68. Elevator means 108 for the lower mould 62 is provided in the form of actuating cylinder 66: similarly, an actuating cylinder 65 is provided for upper mould 61. The press 69 is provided with third conveyor means 58 in the form of rollers 59 to convey the glass sheet 11 onto the ring constituted by lower mould 62, but the majority of rollers 59 within the press have been omitted from FIG. 2 for clarity. The glass sheet 11 is preferably pressed by lower mould 62 rising up to upper mould 61 so that the sheet is in contact with both moulds simultaneously and is pressed into shape between them. Alternatively, pressing may be achieved as a result of the upper mould 61 descending partway towards the lower mould 62. In either case, the lower mould rises from its initial position during the pressing step.

Figure 3:
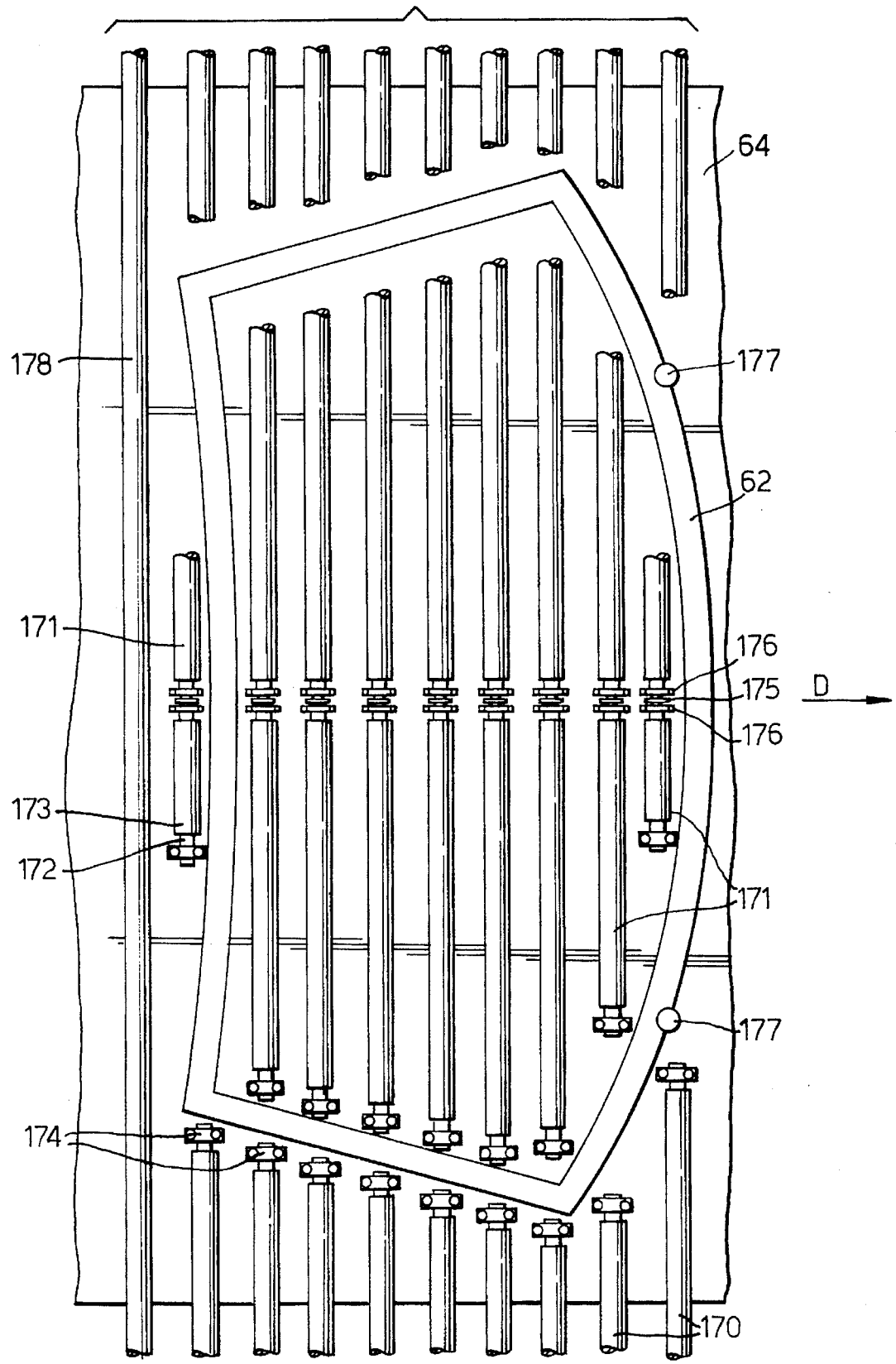
FIG. 3 is a plan view of a conveyor means and a ring mould for use in a press forming part of a press bending apparatus in accordance with the invention.

FIG. 3 shows more detail of conveyor rollers 59 and the ring constituted by outline lower mould 62. FIG. 3 is a plan view, and so it is the upper surface of mould 62 which is shown. In the embodiment illustrated, some of the rollers 59, such as roller 178, extend across substantially the full width of the apparatus. Others of the rollers 59 are shorter, such as stub rollers 170, which extend from one side of the apparatus partway towards the centreline 17 (FIG. 1), and auxiliary rollers 171, which do not extend all the way to either side of the apparatus, but span the lower mould. Rollers of these types are known in general terms from WO 91/03432 which corresponds to U.S. Pat. No. 5,004,492, the disclosure of which is hereby incorporated herein by reference. The majority of auxiliary rollers 171 are provided within the mould 62. Rollers 59 may be curved so as to complement the curvature of the upper surface of mould 62, and the rollers comprise an inner flexible shaft 172 with an outer flexible sleeve 173 so that they are capable of rotation in a curved configuration, as is well known in the art. The shorter rollers are arranged to terminate as close as possible to the upper surface of mould 62 to optimise support for the heat-softened glass sheet. Similarly, the spacing of rollers 59 in the direction of the centreline 17 of the apparatus (shown on FIG. 1) is small to optimise support for the sheet. Rollers 59 may in general be driven by conventional sprocket and chain means, arranged at the sides of the apparatus (i.e. the top and bottom of FIG. 3), but these are not shown in the drawing. However, auxiliary rollers 171, which do not extend all the way to the sides, require separate drive means and bearings. These rollers are rotatably supported on bearings housed in brackets 174, as are shown in the lower half of FIG. 3. It is to be understood that the roller ends indicated in the upper half of FIG. 3 are similarly supported, although the brackets have not been drawn in for these roller ends.

Auxiliary rollers 171 are driven from below via sprockets 175 which are preferably centrally located on the roller. These sprockets may be driven by conventional engineering means such as chains or further sprockets (not shown) powered by a driveshaft (not shown) extending from one side of the apparatus under rollers 59. Auxiliary rollers 171 in fact comprise two roller segments which are united, driven and also rotatably supported at a convenient point such as the centreline of the apparatus. Support is by bearings within pedestals 176 which, like brackets 174, and rollers 59, are supported by horizontal frame 100. (See FIGS. 7 and 8 below.

Heat-softened glass sheets are conveyed onto mould 62 in the direction of arrow D by rollers 59. Accurate location of the sheet on the rollers above mould 62 may be facilitated by the use of conventional retractable end-stops 177. Alternatively, location of the sheet may be achieved by accurate timing of the lowering of the rollers, as will be explained in more detail below. As described above, the sheet is transferred from rollers 59 as soon as it is in position above mould 62 by lowering rollers 59 and raising mould 62.

It will be appreciated that to lower the glass sheet onto the ring mould 62, it is necessary for all the rollers within the ring mould to be lowered from the upper position. However, depending on the engineering arrangement preferred in individual cases, it may be convenient for other rollers outside the ring mould to be part of the same mechanism, and thus also be lowered from the upper position. This is the case in the embodiment described, but it is not essential for the performance of the invention that all the rollers 59 are lowered.

Figure 4:
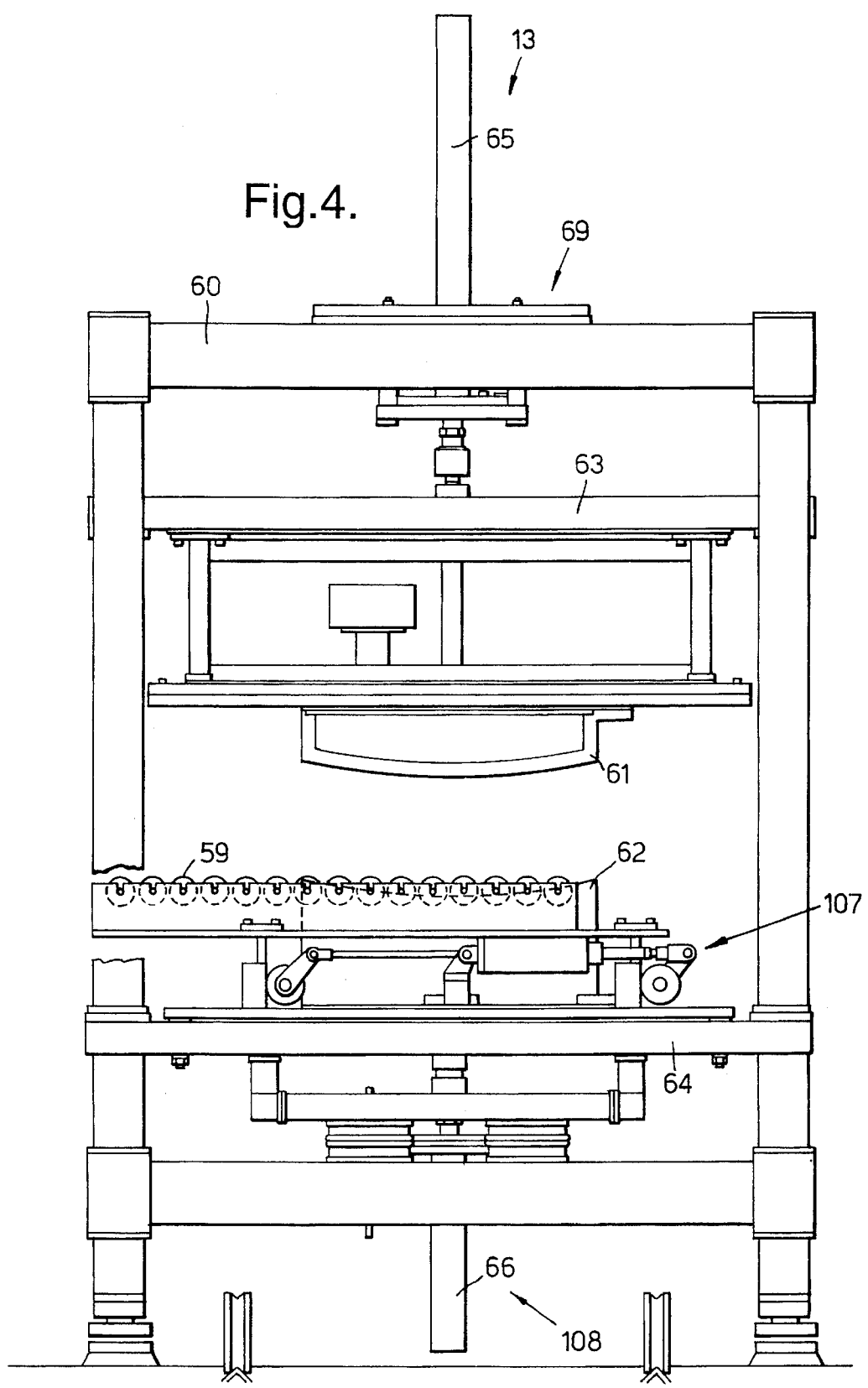
FIG. 4 is a side view, partly in section, of part of a press similar to that of FIG. 2 and incorporating a conveyor means and ring mould as shown in FIG. 3, showing part of a mechanism for performing the invention.
Figure 5:
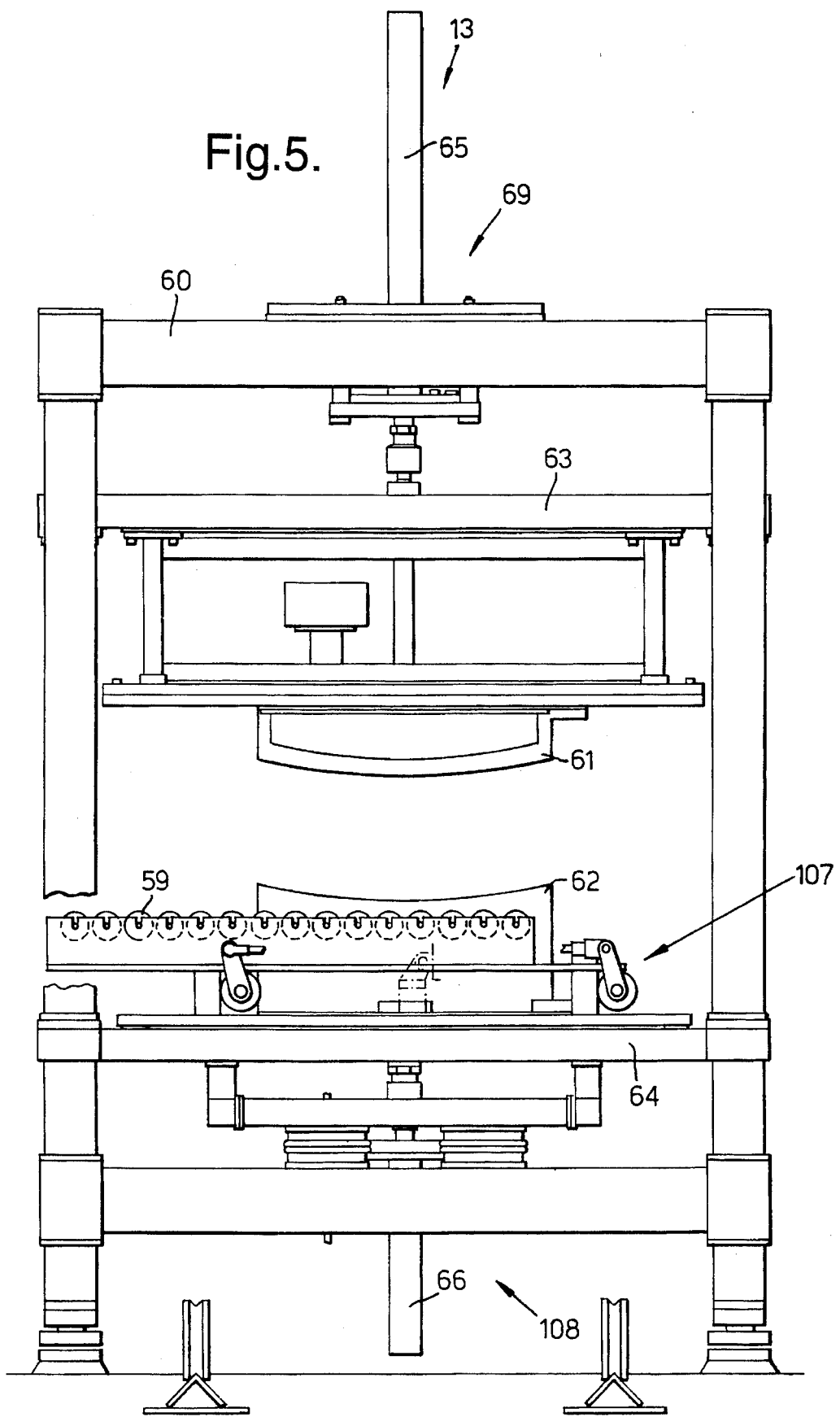
FIG. 5 is a side view of the same part of the apparatus as in FIG. 4, showing the mechanism in a different position.
Figure 6:
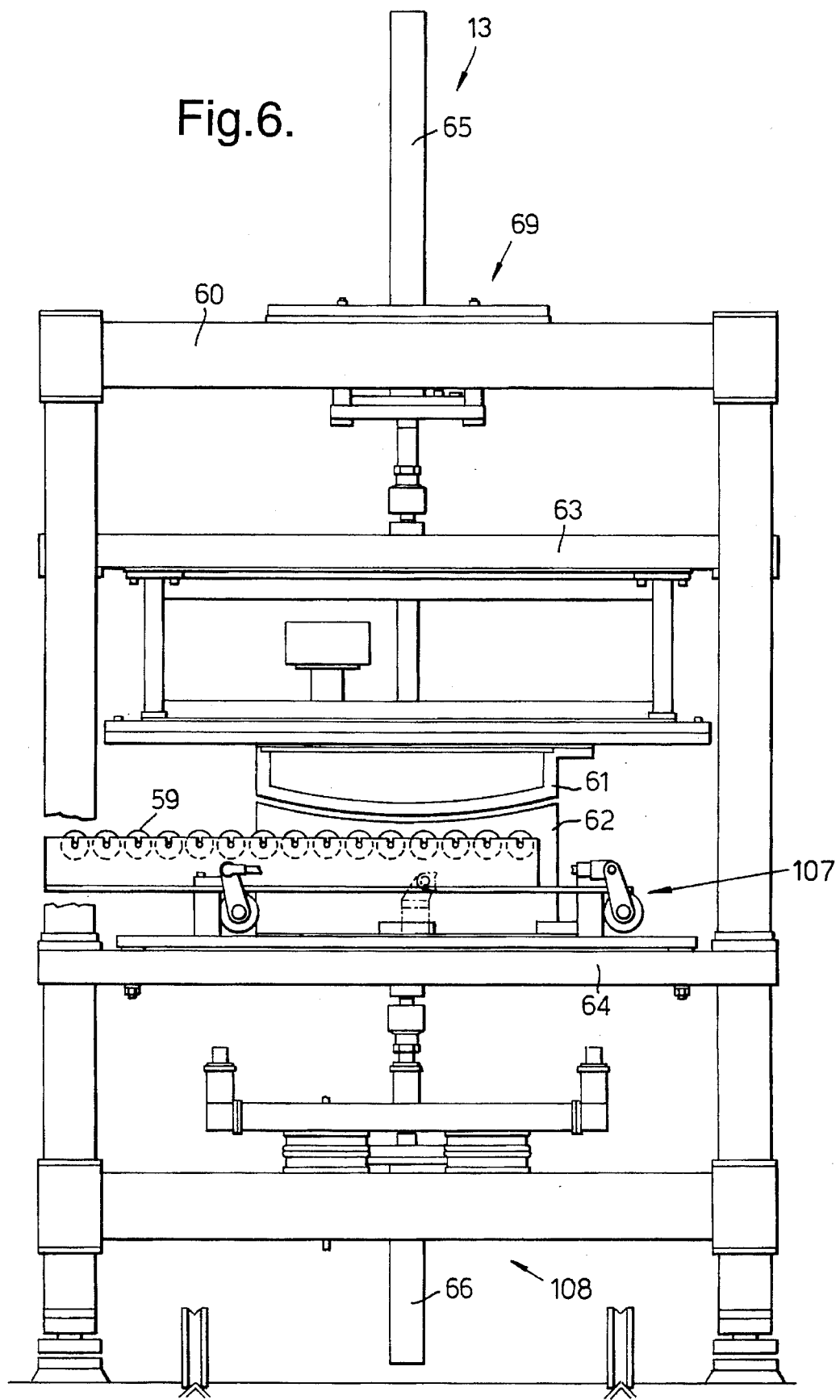
FIG. 6 is a further side view of the apparatus of FIGS. 4 and 5, showing the mechanism in a further position.
Figure 7:
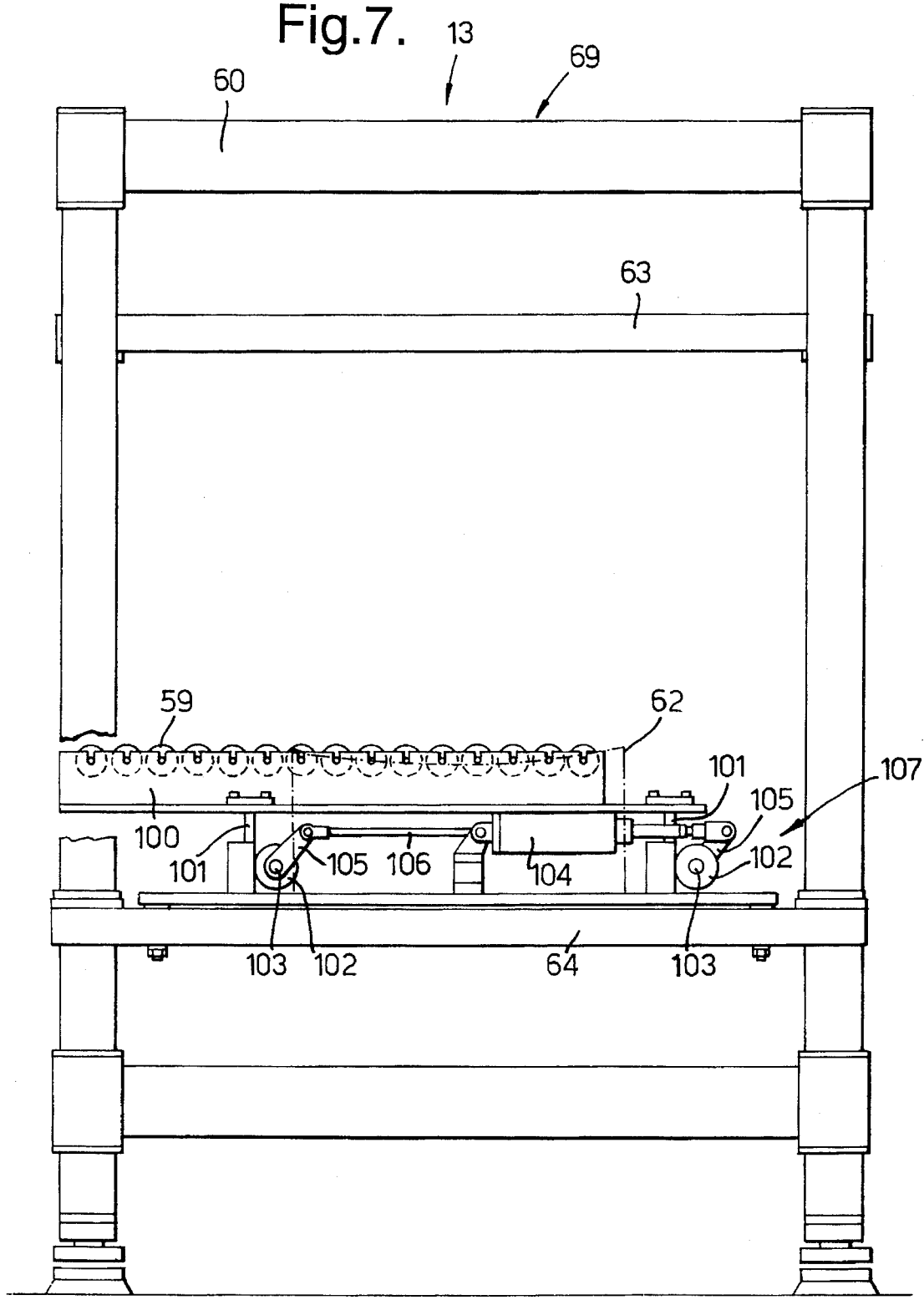
FIG. 7 corresponds to FIG. 4, but has been simplified to show part of the mechanism more clearly, FIG. 8 similarly corresponds to FIG. 5.
Figure 8:
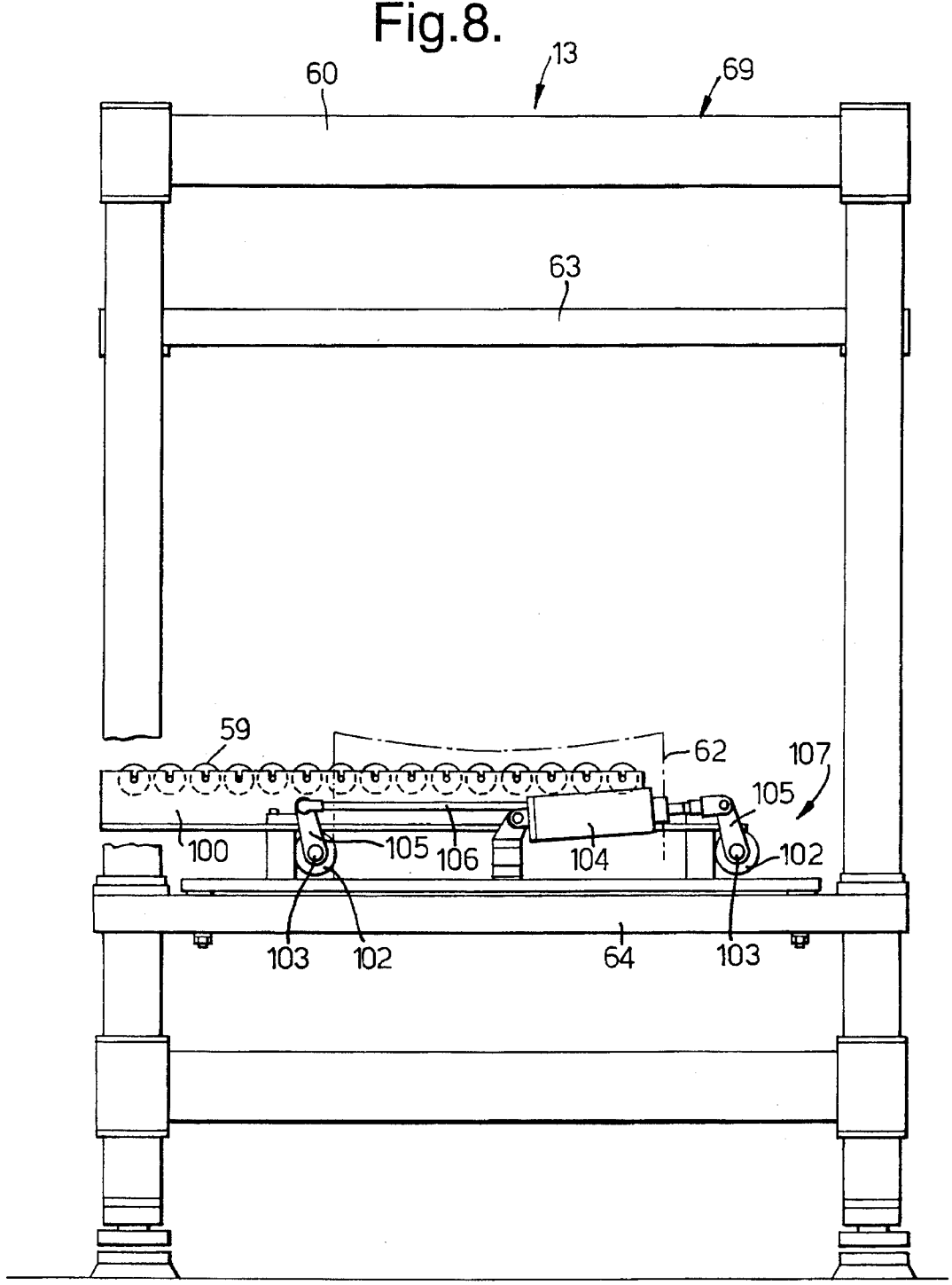

FIGS. 4, 5 and 6 show the sequence of movements, whereas FIGS. 7 and 8 have been simplified to show the lowering means 107 for the rollers 59 more clearly. FIGS. 4 to 8 show a press station 13 and press 69 which are the same as that of FIG. 2 in all fundamental aspects, and differ in appearance only because of differences in the detail of the press 69. FIG. 4 is a side view of the press station 13 showing more detail of rollers 59 and their support. In FIG. 4, rollers 59 are in an initial upper position, level with the furnace conveyor rollers (not shown), and the lower mould 62 is below the level of rollers 59 ready for the arrival of a heat-softened glass sheet. A photosensor (not shown) detects the entry of the sheet into the press station and starts an electronic timing counter running, as is well known in the art. The timing of the subsequent movements is sequenced with reference to this timing counter.

As soon as the sheet is in position above the mould 62, rollers 59 are lowered by the lowering means 107 which is described below. FIG. 5 shows rollers 59 in the lowered position. If the timing of the lowering operation is sufficiently accurate, it is possible to dispense with the endstops 177 of FIG. 3 altogether, as the sheet will lose contact with rollers 59 and hence stop advancing at the instant when it is in the correct position.

In a preferred manner of operation, the glass sheet decelerates smoothly as it approaches its correct position on the conveyor rollers relative to the mould 62. At the instant in which it would otherwise become stationary on the rollers, they are lowered to transfer the sheet. In this way, the sheet never becomes stationary on the rollers, and so the opportunity for distortion to be introduced into the sheet due to cooling by the rollers, or for marking of the sheet due to pressure resulting from the weight of the sheet on the rollers, is minimised.

Simultaneously with, or slightly later than, the lowering of the rollers, actuating cylinder 66 is operated, causing lower platen 64 to rise together with lower mould 62, rollers 59, and their associated mechanism including lowering means 107. The piston of cylinder 66 is extended until the sheet is pressed against upper mould 61. FIG. 6 shows the moulds in this position, the lower mould 62, rollers 59 and lower platen 64 all having been raised together. Next, the piston of cylinder 66 retracts, lowering the lower mould 62, rollers 59, and lower platen 64. Bent sheet 11 is preferably retained on the upper vacuum mould 61 as a result of the reduced pressure within the upper mould, and the sheet may then be transferred to the cooling station 14, e.g. by a shuttle ring onto which the sheet is deposited, or by sideways movement of the upper mould. Alternatively, if upper mould 61 is not a vacuum mould, the bent sheet 11 descends with the lower mould and is removed from it by other means known in the art.

FIGS. 7 and 8 show details of the lowering means 107 for lowering rollers 59 relative to lower mould 62, mounted in press frame 60. Apart from the phantom outline of the upper part of lower mould 62, the press members, their actuating cylinders, and guiding members have all been omitted so as to reveal the mechanism of the lowering means better. Rollers 59 are mounted in a horizontal frame 100 which is itself supported by lower platen 64 so that frame 100 and rollers 59 may reciprocate in the vertical direction with platen 64. Platen 64 therefore constitutes a common support for the conveyor means and the ring mould. Frame 100 is mounted on a plurality of toothed racks 101, which are in engagement with pinions 102 mounted on axles 103 for rotational movement. The piston of a cylinder 104 is connected to a crank 105, itself connected to other cranks 105 by connecting-rod 106. The cranks 105 are fixedly mounted on pinion axles 103, so that generally horizontal movement of the piston is converted to rotational movement of pinions 102, causing vertical movement of racks 101 relative to platen 64. In FIG. 7 the rollers 59 are in the upper position, in which they are level with the furnace conveyor rollers (not shown), and slightly above the uppermost part of lower mould 62 so as to receive a glass sheet 11 arriving from the furnace 12 and convey it to a position directly above the lower mould. An instant before the sheet 11 is due to arrive in position directly above the lower mould 62, roller lowering cylinder 104 and lower mould actuating cylinder 66 (FIGS. 4–6) are operated so that the rollers 59 are lowered to a lowered position below the lower mould 62, transferring the sheet 11 from the rollers 59 the moment it has arrived in position, and the lower mould is raised as the piston of cylinder 66 extends on its pressing stroke.

FIG. 8 shows the rollers lowering means 107 of FIG. 7 with the rollers 59 in the lowered position, i.e. the piston of cylinder 104 has retracted and pinions 102 and cranks 105 have rotated anti-clockwise as viewed. The position of lower mould 62 is again indicated in phantom for reference in its lower position corresponding the position in which it is shown in FIG. 7 (thereby revealing the extent to which rollers 59 have been lowered), but in actual fact it would normally have started rising by the time rollers 59 have been completely lowered as shown in FIG. 8. The rollers 59 remain substantially horizontal at all times, i.e. in the upper position, during lowering, and in the lower position.

While the actuating cylinders referred to in this description are pneumatically driven, it will be evident to the skilled person that hydraulically or electrically driven cylinders may be employed instead.

What is claimed is:

1. A method of bending a glass sheet, in a bending apparatus including a furnace for heating the sheet, substantially horizontal conveyor means for transport of the sheet, and a ring mould having an upper shaping surface, the method comprising the steps of:

heating the sheet to a heat-softened condition in said furnace, conveying the sheet on said conveyor means to a prescribed position above the upper shaping surface of said ring mould, transferring the sheet from the conveyor means onto the ring mould, bending the sheet to a predetermined shape, and cooling the bent sheet, wherein transferring the sheet is effected by lowering part of the conveyor means from an upper position, in which the conveyor means conveys the sheet to said prescribed position, to a lower position below the upper shaping surface of the ring mould, the parts of the conveyor means remaining substantially horizontal, and wherein bending the sheet comprises the step of raising both the ring mould and the conveyor means.

2. A method as claimed in claim 1, including bending the sheet in a first station and transferring the bent sheet to a second station wherein the sheet is cooled.

3. A method as claimed in claim 1, including transferring the heated sheet onto the ring mould outside the furnace.

4. A method as claimed in claim 1, including lowering part of the conveyor means through the ring mould.

5. A method as claimed in claim 1, including supporting the ring mould and the conveyor means on a common support, and raising both the ring mould and the conveyor means by raising the common support.

6. A method as claimed in claim 1, wherein raising of the ring mould begins before lowering of the conveyor means finishes.

7. A method as claimed in claim 1, wherein raising of the ring mould begins at the same time as lowering of the conveyor means finishes.

8. A method as claimed in claim 1, wherein raising of the ring mould begins after lowering of the conveyor means has finished.

9. A method as claimed in claim 1, wherein the step of raising the ring mould includes raising it until it presses the sheet against an upper press bending mould.

10. An apparatus for bending a glass sheet, comprising:

a furnace for heating the sheet to a heat-softened condition, a ring mould having an upper shaping surface, substantially horizontal conveyor means for conveying the sheet to a prescribed position above the upper shaping surface of said ring mould, raising/lowering means for moving part of the conveyor means between an upper position, in which the conveyor means conveys the sheet to said prescribed position, and a lower position below the upper shaping surface of the ring mould, in which lower position the part of the conveyor means remains substantially horizontal, elevator means operable to raise both the ring mould and the conveyor means, shaping means for bending the sheet to a predetermined shape, and means for cooling the sheet.

11. An apparatus as claimed in claim 10, wherein part of the conveyor means is within the circumference of the ring mould.

12. An apparatus as claimed in claim 10, wherein the conveyor means includes a plurality of spaced rollers arranged to define a surface for supporting the glass sheet.

13. An apparatus as claimed in claim 12, wherein at least some of the rollers are within the circumference of the ring mould, and said rollers substantially span said ring mould.

14. An apparatus as claimed in claim 10, wherein a common support is provided for the ring mould and the conveyor means, the elevator means being arranged to raise the common support.

15. An apparatus as claimed in claim 10, wherein the ring mould is a lower press bending mould, and the shaping means includes an upper press bending mould.

16. An apparatus as claimed in claim 14, wherein the common support is a lower press bending platen, and the ring mould is a lower press bending mould carried upon said lower press bending platen.

* * * * *